United States Patent
Jeong et al.

(10) Patent No.: US 9,927,916 B2
(45) Date of Patent: Mar. 27, 2018

(54) TOUCH DETECTION DEVICE WITH SENSOR PADS HAVING BAR-SHAPED STRIPS

(71) Applicant: CRUCIALTEC CO., LTD., Gyeonggi-do (KR)

(72) Inventors: Ick Chan Jeong, Gyeonggi-do (KR); Jun Yun Kim, Gyeonggi-do (KR)

(73) Assignee: CRUCIALTEC CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/911,898

(22) PCT Filed: Aug. 19, 2015

(86) PCT No.: PCT/KR2015/008658
§ 371 (c)(1),
(2) Date: Feb. 12, 2016

(87) PCT Pub. No.: WO2016/028081
PCT Pub. Date: Feb. 25, 2016

(65) Prior Publication Data
US 2016/0357336 A1    Dec. 8, 2016

(30) Foreign Application Priority Data

Aug. 19, 2014  (KR) .................. 10-2014-0107768
Aug. 19, 2014  (KR) .................. 10-2014-0107770
Aug. 18, 2015  (KR) .................. 10-2015-0116290

(51) Int. Cl.
G06F 3/033    (2013.01)
G06F 3/041    (2006.01)
G06F 3/044    (2006.01)

(52) U.S. Cl.
CPC ............ *G06F 3/0418* (2013.01); *G06F 3/044* (2013.01); *G06F 3/0412* (2013.01); *G06F 2203/04104* (2013.01)

(58) Field of Classification Search
USPC .................................................. 345/173–174
See application file for complete search history.

(56) References Cited

U.S. PATENT DOCUMENTS 8,717,304 B2 * 5/2014 Cho ...................... G06F 3/0416
                                                       345/173
9,013,436 B2 * 4/2015 Liu .......................... G06F 3/047
                                                       345/173

(Continued)

FOREIGN PATENT DOCUMENTS

KR      10-1112780       3/2012
KR      10-2013-0035833  4/2013

OTHER PUBLICATIONS

Korean Office Action dated Jul. 20, 2016 in Korean Patent Application No. 10-2015-0116290 (with English translation).

*Primary Examiner* — Roy P Rabindranath
(74) *Attorney, Agent, or Firm* — Plumsea Law Group, LLC

(57) ABSTRACT

According to one embodiment, a touch detection device which includes a plurality of sensor pads made of a conductive material, wherein at least one side of the sensor pad consists of a plurality of bar-shaped strips extended to one direction, and sensor pads adjacent to each other in the column direction are arranged to be engaged with each other, is provided.

19 Claims, 11 Drawing Sheets

(56) References Cited

U.S. PATENT DOCUMENTS

| | | | |
|---|---|---|---|
| 2007/0165006 A1* | 7/2007 | Sato | G06F 3/0488 345/174 |
| 2008/0007533 A1* | 1/2008 | Hotelling | G06F 3/044 345/173 |
| 2010/0045625 A1* | 2/2010 | Yang | G06F 3/044 345/173 |
| 2011/0095990 A1* | 4/2011 | Philipp | G06F 3/044 345/173 |
| 2012/0235936 A1* | 9/2012 | Yeh | G06F 3/0416 345/173 |
| 2015/0277639 A1* | 10/2015 | Li | G06F 3/0412 345/173 |

* cited by examiner (a)

(b)

(c)

(d)

TOUCH DETECTION DEVICE WITH SENSOR PADS HAVING BAR-SHAPED STRIPS

CROSS-REFERENCE TO RELATED APPLICATIONS

This application is the U.S. national stage application of International Patent Application No. PCT/KR2015/008658, filed Aug. 19, 2015, which claims priority to Korean Application Nos. 10-2014-0107768, filed Aug. 19, 2014, 10-2014-0107770, filed Aug. 19, 2014, and 10-2015-0116290, filed Aug. 18, 2015, the disclosures of each of which are incorporated herein by reference in their entirety.

TECHNICAL FIELD

The present invention relates to a touch detection device, and more specifically to a touch device capable of detecting an exact point where the touch is made even though the touch is made by a touch generating means with a narrow cross section.

BACKGROUND ART

A touchscreen panel, which is a device for inputting user's commands by touching letters or figures displayed on the screen of an image display device with a human finger or other touch means, is generally attached to an image display device. The touchscreen panel converts the location touched with the human finger, etc. into electrical signals. The electrical signal is used as an input signal.

FIG. 1 is a perspective view illustrating the configuration of a conventional touch detection device.

The touch detection device illustrated in FIG. 1 includes a touch panel 20, a driving device 30 and a circuit substrate 40 connecting them.

The touch panel 20 includes a plurality of sensor pads 22 formed on a substrate 21 and arranged in the form of polygonal matrix, and a plurality of signal wirings connected to the sensor pads 22.

For each signal wiring 23, one end is connected with the sensor pad 22 and the other end extends to the bottom edge of the substrate 21. The sensor pad 22 and signal wiring 23 may be patterned on a cover glass 50.

The driving device 30 selects one by one of the plurality of sensor pads 22 in order, and measures the capacitance of the corresponding sensor pad 22. Accordingly, it detects whether touch is generated.

The signal wiring 23 connects the sensor pad 22 and the driving device 30, and this signal wiring 23 may be patterned with an indium-tin oxide (ITO).

FIG. 2 is a plan view illustrating the configuration of the touch detection device illustrated in FIG. 1.

Referring to FIG. 2, in the touch panel 20, the sensor pads 22 are arranged in a plurality of rows and columns, and the driving device 30 determines the point where the touch is generated based on an output signal from the sensor pads 22. In FIG. 2, the signal wiring 23, which delivers the output signal from each of the sensor pads 22 to the driving device 30, is omitted.

Since the touch generating means forms touch capacitance in a relation with the sensor pad 22, the output signal from the sensor pad 22 where the touch is generated is different from that of the sensor pad where no touch is generated. The touch capacitance may vary depending on the area of the sensor pad 22 with which the touch generating means is in contact. As the area broadens, the touch capacitance increases, and accordingly, the difference in size of signals outputted from the sensor pad 22 before and after touch increases.

When the touch generating means generates touch only on one sensor pad 22, no problem occurs. However, since the sensor pad 22 is formed of a certain size of quadrangle structure and is arranged in rows and columns, a touch generating area may cover a plurality of sensor pads 22.

As an example, as illustrated in FIG. 2, when supposing a case where a touch area T formed by the touch generating means is formed to cover four sensor pads 22_1, 22_2, 22_3 and 22_4, an output signal from each of the four sensor pads 22_1, 22_2, 22_3 and 22_4 is different from that of the sensor pad where no touch is generated.

When supposing that an area contacting the touch generating means is largest in a second sensor pad 22_2, the difference in output signal before and after touch would be the greatest in the second sensor pad 22_2. Thus, the driving device 30 determines that the touch is generated in the second sensor pad 22_2.

A conventional method for detecting touch determines in which sensor pad the touch is generated based on an area contacted by the touch generating means.

As such, when the cross section of the touch generating means is broad and thus the touch generating area T is great, there would be no problem in accuracy. However, when the cross section of the touch generating means is smaller than the area of the sensor pad 22, the following problems may occur.

Supposing that a touch is generated in the area of a fifth sensor pad 22_5 by the touch generating means, the touch may be generated at the upper left side in the area of the fifth sensor pad 22_5 Ta, the touch may be generated around the center Tb, or the touch may be generated at the right side edge Tc. However, since capacitance formed between the touch generating means and the sensor pad 22_5 is the same in all of these three cases, the driving device 30 will determine that the touch is generated in the area of the fifth sensor pad 22_5 in all three cases.

Accordingly, although touch points are different in the three cases, it is determined that the touch is generated in the center, which is a center of the fifth sensor pad 22_5, so an accuracy problem occurs.

Thus, a technology capable of improving accuracy of touch detection, even in minute touch operations, is required. Additionally, it is necessary to detect multiple touch points with improved accuracy.

DETAILED DESCRIPTION OF THE INVENTION

Technical Subject

The goal of the present invention is to solve the above-mentioned problems of the related art. It is an object of the present invention to improve accuracy of touch detection by forming a length of the column direction of the sensor pad of the touch detection device to be long, while constituting areas at both ends to the column direction with bar-shaped strips, so as to be interlocked with adjacent sensor pads.

Also, it is another object of the present invention to improve resolution of detection on whether touch is generated in the row direction while having the same number of channels as the conventional method.

Also, it is yet another object of the present invention to further improve accuracy in touch detection by preventing the formation of parasitic capacitance of an area interlocked with the adjacent sensor pad.

Meanwhile, it is still another object of the present invention to remove a difference in optical transmittance per area by making patterns of an area where a sensor pad is formed and an area where a signal wiring is formed similar to each other.

Furthermore, it is yet another object of the present invention to prevent the generation of differences in color temperature and sense of color per unit area when a touch detection device is laminated on a display device.

Means for Solving Technical Subject

According to an embodiment of the present invention for achieving the above-mentioned objects, a touch detection device, which includes a plurality of sensor pads made of conductive materials, wherein at least one side of the sensor pad consists of a plurality of bar-shaped strips extended to a first direction, and the sensor pads adjacent to each other in the column direction are arranged to be interlocked with each other by the plurality of bar-shaped strips, is provided.

A part of the sensor pad may form a shared area node with an adjacent sensor pad where the bar-shaped strips are interlocked and arranged.

The sensor pad may include a middle sub-pad; and a top sub-pad and a bottom sub-pad each of which is arranged at the top and bottom of the middle sub-pad and consists of the plurality of bar-shaped strips.

The touch detection device may further include at least one dummy pad arranged between the plurality of bar-shaped strips interlocked with each other, having the longitudinal direction parallel to the first direction.

At least a part of the dummy pads may be formed of a plurality of dummy pads separated from each other in the longitudinal direction.

The touch detection device may further include at least one dummy pad which interconnects a plurality of dummy pads parallel to the first direction and is arranged in parallel to a second direction which is vertical to the first direction.

The touch detection device may further include at least one dummy pad arranged to be parallel to the second direction which is vertical to the first direction, formed in a space where the plurality of dummy pads are separated from each other in the longitudinal direction.

The plurality of dummy pads separated from each other in the longitudinal direction and arranged may have a length the same as the width of the bar-shaped strip.

The touch detection device may further include a plurality of signal wirings connected to a driving unit extended from each of the sensor pads in the first direction and including the touch detection unit. When the number of sensor pads arranged in the first direction is n, the width of the plurality of signal wirings is L, and the gap between the plurality of signal wirings is S, the width of the plurality of bar-shaped strip may be greater than $(n-1) \times (L+S)$.

The width of the plurality of bar-shaped strips may 120% or more compared to $n(L+S)+S$.

The width of the plurality of bar-shaped strips may be 0.5 times less than a diameter of the touch area formed by the touch generating means or a length of the width direction of the bar-shaped strip.

A plurality of grooves whose longitudinal direction is parallel to the first direction may be formed at an edge of the sensor pad, and a plurality of slits whose longitudinal direction is parallel to the first direction may be formed in at least a part of the sensor pad.

Distal ends of the areas separated by the groove may be located at different heights with respect to a straight line in the second direction which is vertical to the first direction.

The width of the dummy pad and the gap between adjacent dummy pads arranged in parallel may be the same as the width of the areas separated by the groove and the width of the groove.

The plurality of grooves may extend from the edge of the sensor pad or from one end of the bar-shaped strip. When the plurality of grooves is formed to be parallel to the row direction at a predetermined interval, a depth of the groove may periodically repeat increasing or decreasing with respect to the row direction.

Segments forming the sensor pads, grooves and slits may be formed of a saw pattern.

The touch detection device may further include a touch detection unit which detects a first touch generating signal according to the change in touch capacitance formed between each of the sensor pads and the touch generating means, and a second touch generating signal according to the change in mutual capacitance between the sensor pads which are adjacent to each other in the first direction and are interlocked with each other by the plurality of bar-shaped strips; and a touch information processing unit which processes touch information generated in a sole area node consisting of a part of a single sensor pad or touch information generated in a shared area node where the sensor pads are interlocked with each other.

When the first touch generating signal and the second touch generating signal detected from the sole area node and the shared area node in the same sensor pad are a predetermined value or higher, the touch information processing unit may determine that multiple touches are generated in the same sensor pad.

When the second touch generating signal is detected in all shared area nodes to which a specific sensor pad belongs, and the size of the first touch generating signal according to the change in touch capacitance formed in the specific sensor pad is less than the predetermined value, the touch information processing unit may determine that multiple touches are generated in each of the shared area nodes formed by the specific sensor pad.

The touch detection unit may detect the second touch generating signal based on a changed value of an output voltage level of another sensor pad by changing the potential of a specific sensor pad among the sensor pads forming the shared area node.

Effect of Invention

According to the present invention, in a touch panel consisting of sensor pads interlocked with each other in a predetermined direction, by using a plurality of capacitance touch detection methods together, it can be accurately determined where the touch is generated between an area where the sensor pad is solely arranged and an area where the sensor pads are interlocked with each other and arranged.

Also, according to the present invention, since it can be determined whether the touch is generated in the area where the sensor pads are interlocked with each other and arranged through a mutual capacitance touch detection method, the touch generating points of multiple touches whose mutual distance is close can be accurately determined.

According to the present invention, the touch generating point can be accurately determined by forming the length of the column direction of the sensor pad in the touch detection device to be long, while configuring areas at both ends to the column direction with bar-shaped strips so as to be interlocked with adjacent sensor pads, and comparing the sizes of touch detecting signals outputted from each sensor pad when the touch is generated in the corresponding area.

Additionally, according to the present invention, the touch detection device maintaining its resolution while reducing the number of sensor pads arranged in the column direction, and improving the resolution while increasing the number of columns with the reduced number of sensor pads in the column direction, to use the same number of channels as a whole, can be obtained.

Also, according to the present invention, by placing a dummy pad between the adjacent sensor pads, parasitic capacitance between both sensor pads can be formed and signal interference can be controlled to a desired level.

Meanwhile, according to the present invention, since grooves and slits with the same width as the gap between the signal wirings are formed over the entire area of the sensor pads, there would be no difference in pattern between the area where the sensor pad is arranged and the area where the signal wiring is arranged.

Also, according to the present invention, as the segments parallel to the column direction among the segments forming the sensor pad are formed in the saw pattern, differences in color temperature and the sense of color per unit area do not occur when a touch detection device is laminated on a display device.

MODE FOR CARRYING OUT THE INVENTION

Figure 1:
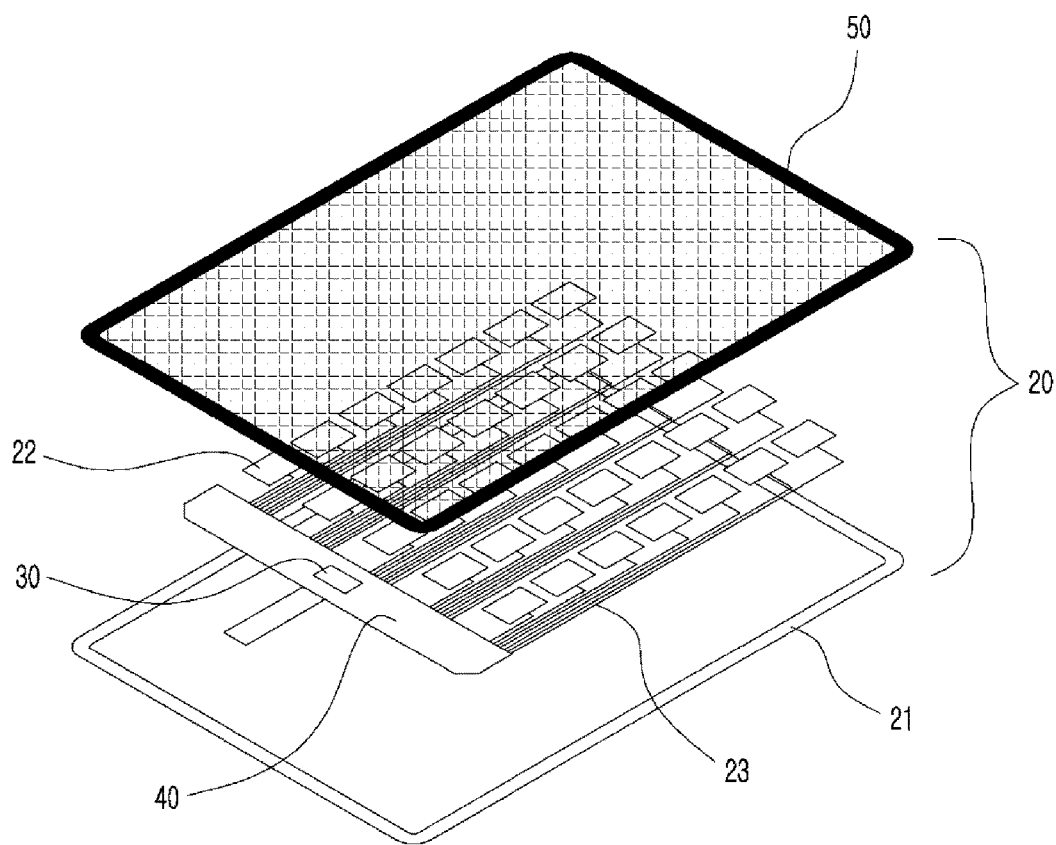
FIG. 1 is a view illustrating the configuration of a touch panel of a conventional touch detection device.
Figure 2:
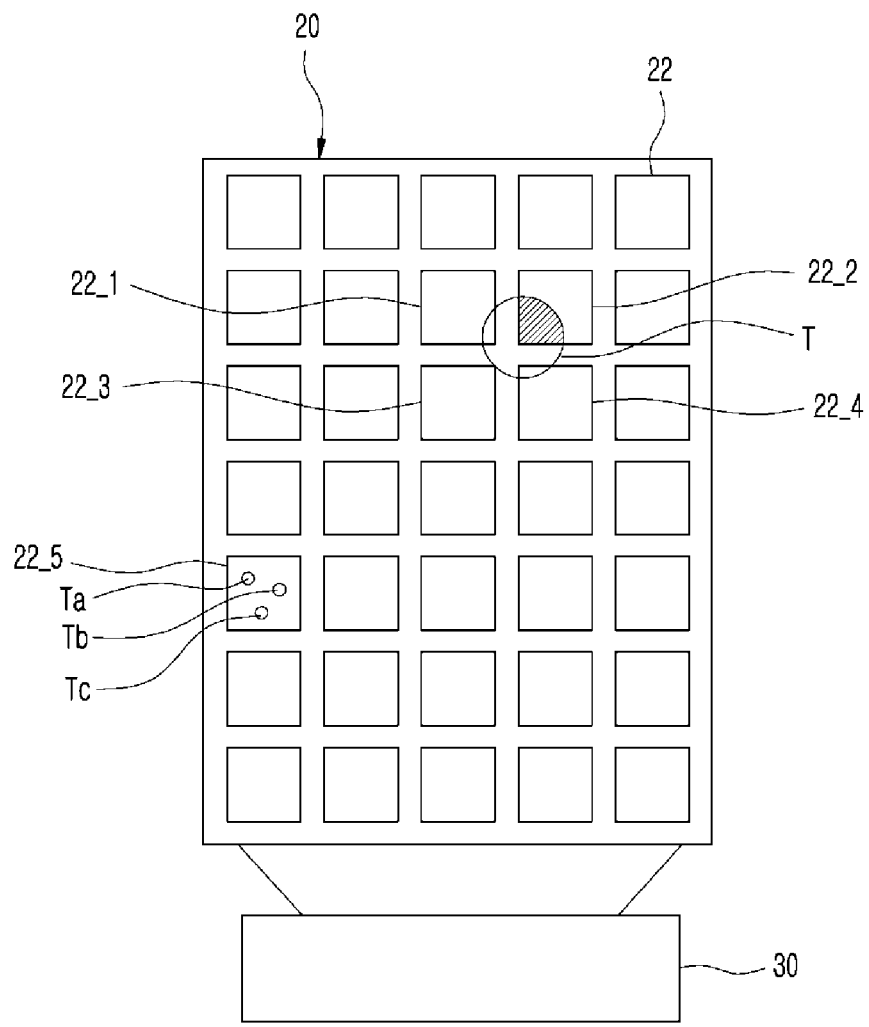
FIG. 2 is a view explaining a touch detection operation for the touch panel of FIG. 1.

Hereinafter, the present invention will be explained with reference to the accompanying drawings. The present invention, however, may be modified in various different ways, and should not be construed as limited to the embodiments set forth herein. Also, in order to clearly explain the present disclosure, topics not directly related to the present disclosure are omitted, and like reference numerals are used to refer to like elements throughout.

Throughout the specification, it will be understood that when an element is referred to as being "connected to" another element, it may be "directly connected to" the other element, or intervening elements or layers may be present. In addition, it will also be understood that when a component "includes" an element, unless said otherwise, it should be understood that the component may include other elements.

Hereinafter, examples of the present invention will be explained in detail with reference to the accompanying drawings.

Figure 3:
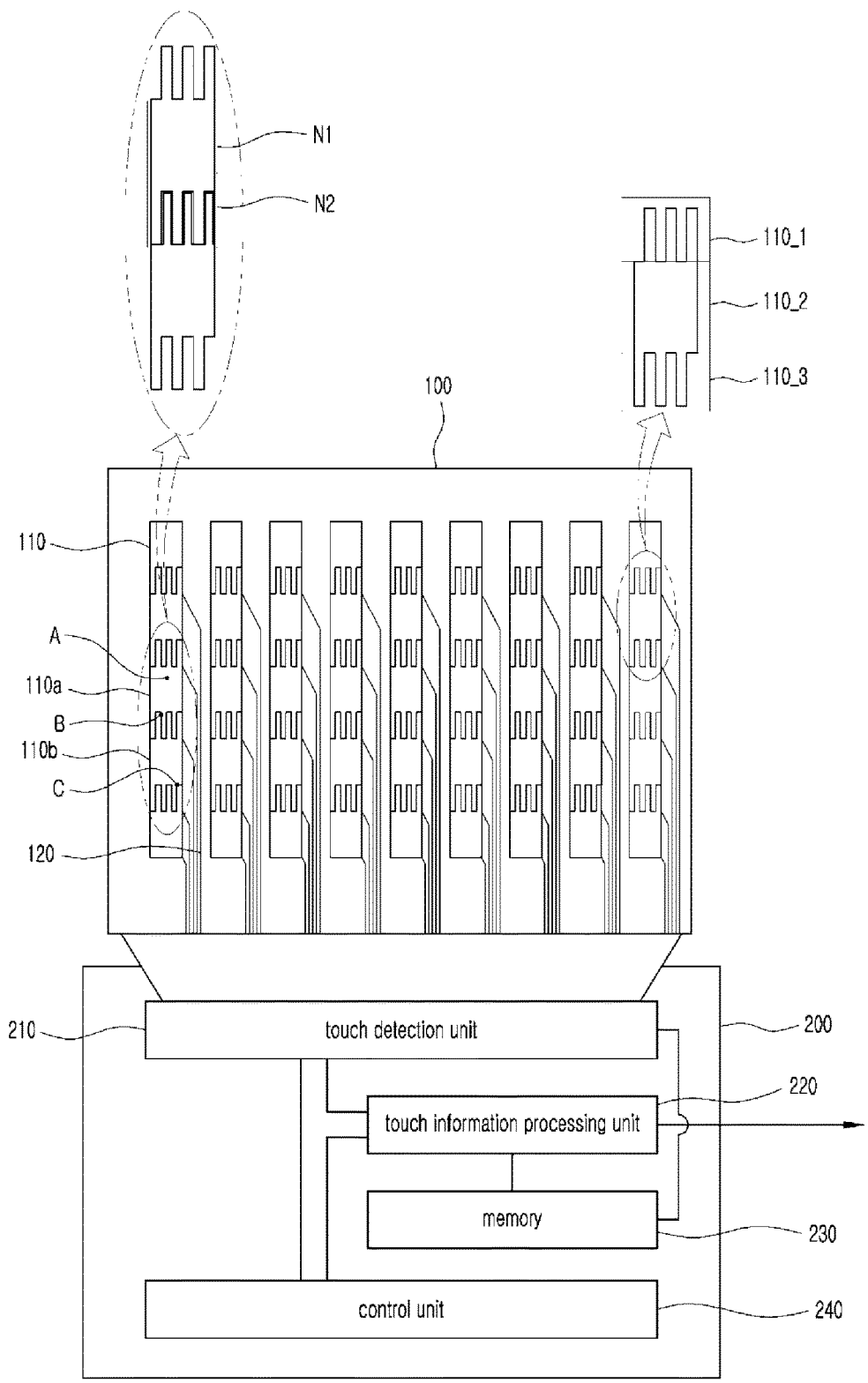
FIG. 3 is a view explaining the configuration of a touch detection device according to an embodiment of the present invention.

FIG. 3 is a view explaining the configuration of a touch detection device according to an embodiment of the present invention.

Referring to FIG. 3, the touch detection device according to the embodiment includes a touch panel 100 and a driving unit 200.

The touch panel 100 includes a plurality of sensor pads 110 arranged in a plurality of rows and columns. Each of the plurality of sensor pads 110 is connected to the driving unit 200 through one signal wiring 120.

The driving unit 200 may include a touch detection unit 210, a touch information processing unit 220, a memory 230, a control unit 240, etc., and may be implemented by at least one integrated circuit (IC) chip. The touch detection unit 210, touch information processing unit 220, memory 230 and control unit 240 may be separated from each other, or may be integrated with two or more constituents to be implemented.

The touch detection unit 210 may include a plurality of switches connected to the signal wiring 120, a plurality of capacitors and a plurality of impedance devices. For detecting touch, a multiplexer for selecting the sensor pad 110 may be further included. According to one embodiment, the touch detection unit 210 selects a specific sensor pad 110 through the multiplexer and detects whether touch is generated through a signal outputted from the corresponding sensor pad 110.

The sensor pad 110 forms touch capacitance in a relation with a touch generating means. Since signals outputted from the sensor pads 110 vary depending on the touch capacitance, whether the touch is generated for the corresponding sensor pad 110 may be detected through the detection of the output signal. The touch detection unit 210 receives a signal from the control unit 240 to drive circuits for touch detection, and outputs a voltage corresponding to a result of touch detection. Additionally, the touch detection unit 210 may include an amplifier and an analogue-digital converter. Also, the touch detection unit 210 may convert, amplify or digitalize the difference in output signal of each sensor pad 110 to store the change in the memory 230.

The touch information processing unit 220 processes a digital voltage stored in the memory 230 to create necessary information such as information on whether touch is generated, touch area, and touch coordinates, etc.

The control unit 240 controls the touch detection unit 210 and touch information processing unit 220, and may include a micro control unit (MCU) and perform predetermined signal processing through firmware.

The memory 230 memorizes a digital voltage based on the difference in voltage change detected by the touch detection unit 210, and predetermined data used for detecting touch, calculating area, and calculating touch coordinates or real-time data.

The sensor pad 110 of the touch panel 100 according to the embodiment of the present invention may be divided into three parts, a top sub-pad 110_1, a middle sub-pad 110_2, and a bottom sub-pad 110_3.

The middle sub-pad 110_2 is formed in a quadrangle shape. With the middle sub-pad 110_2 formed in a quadrangle shape as a standard, the top sub-pad 110_1 and bottom sub-pad 110_3 in the up and down directions are electrically connected and arranged in the column direction.

The top sub-pad 110_1 and bottom sub-pad 110_3 are formed to include a plurality of bars whose longitudinal direction is parallel to the column direction. That is, at least one side of the sensor pad 110 may include a plurality of bar-shaped strips extended to the column direction.

FIG. 3 illustrates that the top sub-pad 110_1 and bottom sub-pad 110_3 include three bars each, but may be formed with at least two or four bars.

As the top sub-pad 110_1 and bottom sub-pad 110_3 are formed in a bar shape, they may overlap another sensor pad 110 adjacent in the column direction while being electrically insulated in the corresponding area. In other words, the sensor pads 110 adjacent to each other in the column direction may be arranged so that the bar-shaped strips are interlocked with each other while being insulated from each other.

Specifically, the bar-shaped strips of the top sub-pad 110_1 may be interlocked on the same plane with the bar-shaped strips forming the bottom sub-pad of another sensor pad adjacent to the top of the corresponding sensor pad 110 in the column direction while being insulated from each other. Additionally, the bar-shaped strips of the bottom sub-pad 110_3 may be interlocked on the same plane with the bar-shaped strips forming the top sub-pad of another sensor pad adjacent to the bottom of the corresponding sensor pad 110 in the column direction while being insulated from each other.

It should be understood that the first sub-pad and the second sub-pad being interlocked with each other means that the bar-shaped strips forming the second sub-pad are arranged in the gaps between the bar-shaped strips forming the first sub-pad.

According to an embodiment, the length of column direction covered by the sensor pad 110, that is, the sum of lengths of column direction of the top sub-pad 110_1, middle sub-pad 110_2, and bottom sub-pad 110_3 is formed to be greater than the width of row direction of the sensor pad 110. Even if the length of the column direction is long, since some areas of the sensor pads 110 vertically adjacent to each other overlap, and the difference between the sizes of the touch generating signals detected through each sensor pad 110 occurs when the touch is generated, the touch generating point may be accurately detected using the above method.

For example, when the touch is generated at 'A' point in FIG. 3, the touch generating signals outputted from a sensor pad a 110a (for example, a difference value of output signals between the cases where no touch is generated and the touch is generated) will be remarkably great throughout all sensor pads 110, and accordingly, the touch generating point is determined as the sensor pad a 110a.

If the touch is generated at 'B' point in FIG. 3, the touch generating signal will be outputted from the sensor pad a 110a and sensor pad b 110b. However, a greater touch generating signal will be outputted at the sensor pad a 110a. Based thereon, a point which is closer to the sensor pad a 110a between the sensor pad a 110a and sensor pad b 110b will be recognized as the touch generating point.

Next, when the touch is generated at point 'C' in FIG. 3, it may be determined that the touch is generated in the bottom area of the sensor pad b 110b with the same principle as above.

In the embodiment of the present invention, by making the length of column direction of the sensor pad 110 long while making some areas overlapping with another sensor pad 110 adjacent thereto in the column direction, it may be determined how close and to which the sensor pad 110 in the column direction, the touch generating point is when the touch is generated in the overlapping area.

Additionally, by making the width of row direction of the sensor pad 110 narrower than the conventional form, the touch sensing resolution in the row direction may be increased. As a result, accuracy in determining whether a touch is generated and where the touch takes place throughout the entire touch panel 100 may be increased.

Even when making the width of the row direction narrower than the conventional form to increase the number of columns, as will be explained below, since the number of sensor pads 110 arranged in one column is less than that of the conventional form, the touch panel 100 having the same area may be implemented with a smaller number of sensor pads 110 compared to the conventional touch panel, or the touch panel having a broader area may be implemented with the same number of sensor pads.

Thus, accuracy in resolution for sensing whether the touch is generated and in touch detection may be increased while maintaining the same or a smaller number of channels compared to the conventional form.

Referring to FIG. 3 again, n (n is a natural number) sensor nodes N1 and N2 may be formed in one column.

The sensor nodes N1 and N2 may be units for detecting whether touch is generated. The sensor nodes N1 and N2 are divided into a sole area node N1 where one sensor pad 110 is solely arranged and a shared area node N2 where at least two sensor pads 110 are arranged together.

Specifically, a part of the sensor pad a 110a is solely arranged in the sole area node N1, and a part of the sensor pad a 110a and a part of the sensor pad b 110b are arranged together in the shared area node N2 adjacent thereto in the column direction. Specifically, a plurality of bar-shaped strips extended to one direction are arranged to be interlocked with each other. Accordingly, the sole area node N1 may be defined as a node where no strip is arranged.

In one column, the sole area node N1 and the shared area node N2 are alternately formed in the column direction.

In an example of FIG. 3, one sensor pad 110 is arranged in one sole area node N1 and two shared area nodes N2 adjacent to the sole area node N1 in the column direction.

According to the arrangement with this pattern, the number of sensor pads 110 arranged in one column may be smaller than the number of sensor nodes N1 and N2 in one column.

In the example of FIG. 3, the number of sensor pads 110 arranged in one column is five, but the number of sensor nodes N1 and N2 formed by the five sensor pads 110 is nine in total. Generalizing this, when n sensor pads 110 are arranged in one column, a total of 2(n−1)+1 sensor nodes N1 and N2 are formed by the n sensor pads 110.

Accordingly, the same length of column may be formed with a smaller number of sensor pads 110 compared to the conventional method, and the number of columns may be further increased with the reduced number of sensor pads 110. That is, the touch panel having the same area may be implemented with the same number of sensor pads 110 as the conventional method, but the number of columns may be further increased. In other words, the touch panel having the same area may be implemented with the same number of channels as with the conventional method, but the number of columns may be further increased.

Accordingly, the resolution in determination on whether the touch is generated in the row direction may be increased. Additionally, since the determination on whether the touch is generated is possible in each of the sole area node N1 and shared area node N2, the resolution in determination on whether the touch is generated in the column direction will be maintained. As a result, since utilization of the channel increases, the exact touch point may be detected in a broader area of touch.

Figure 4:
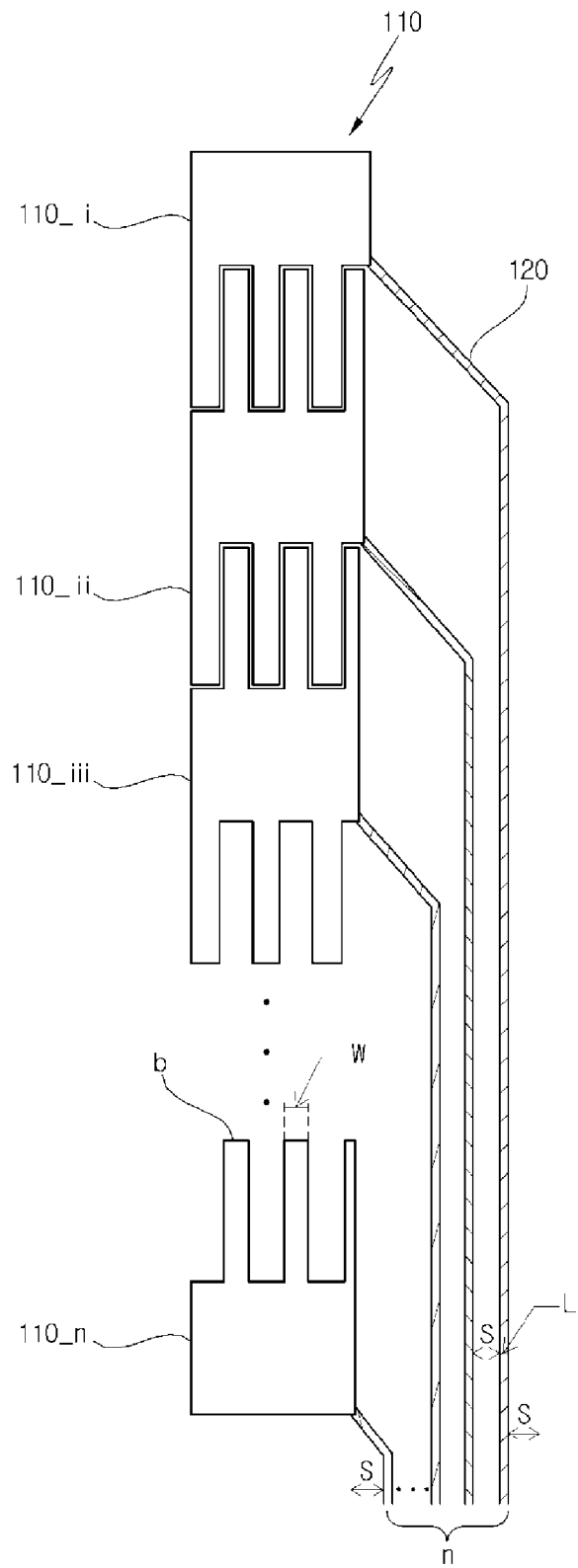
FIG. 4 and FIG. 5 are views illustrating the configuration of the sensor pad according to an embodiment of the present invention.

FIG. 4 is an enlarged view of a sensor pad in one column in the touch panel illustrated in FIG. 3.

Referring to FIG. 4, the sensor pads 110 forming one column are connected to the signal wirings 120, respectively. The signal wirings 120 connect each of the sensor pads 110 to the driving unit 200 (see FIG. 3).

Each signal wiring 120 is extended from the sensor pad 110 to the driving unit 200, and as it is closer to the driving unit 200 in the entire touch panel, the number of signal wirings 120 arranged in the same row will be increased. That is, in the configuration of sensor pad 110 arranged in a plurality of columns, one signal wiring 120 is arranged in the gap between sensor pads 110_$i$ arranged in a first row, and two signal wirings 120 are arranged in the gap between sensor pads 110_$ii$ arranged in a second row. Likewise, n signal wirings 120 are arranged in the gap between sensor pads 110_$n$ arranged in an $n^{th}$ row.

In order to accurately detect touch, each sensor pad 110 must have the same electrical characteristics obtained by its relation to other neighboring constitutional elements. Additionally, when the gap between the sensor pad 110 and the adjacent signal wiring 120 is the same at any location of the touch panel, visibility deviation per area of electronic equipment on which the corresponding touch panel is mounted is removed, which will be helpful for improving visibility. Preferably, the gap between each of the sensor pads 110 and the signal wiring 120 which is the most adjacent thereto may be implemented to be the same as the gap between the plurality of signal wirings 120.

Accordingly, in terms of sensor pads belonging to the same column, the width of sensor pad 110_$i$ which is the farthest from the driving unit 200 is broadest, and the width of the sensor pad 110_$n$ which is the most adjacent to the driving unit 200 is narrowest. Specifically, the width of sensor pad 110_$ii$ arranged in the second row is reduced by the sum of width L of signal wiring 120 and gap S between the signal wirings 120 compared to the width of sensor pad 110_$i$ arranged in the first row. The width of sensor pad 110_$n$ arranged in the $n^{th}$ row is reduced by the total sum of width L of n−1 signal wirings 120 and gap S between the signal wirings 120 compared to the width of sensor pad 110_$i$ arranged in the first row.

According to an embodiment, each sensor pad 110 has bar-shaped strips b extended to the longitudinal direction, separated from each other at a predetermined distance, and arranged to be parallel to each other. When the number of bar-shaped strips b formed in each sensor pad 110 varies in the entire area of the touch panel, deviation in touch detection performance may occur in each sensor pad 110. Specifically, in the sensor pad 110 with a relatively small number of bar-shaped strips b, accuracy in touch detection will be decreased when the touch for the shared area node N2 (see FIG. 3) is generated.

Thus, for the sensor pad 110 which is adjacent to the driving unit 200, it is required to implement the sensor pad to have a narrow width, while not reducing the number of bar-shaped strips b formed in each sensor pad 110.

As mentioned above, the width of the sensor pad 110_$n$ in the $n^{th}$ row which is the most adjacent to the driving unit 200 is reduced by (n−1)×(L+S) compared to the sensor pad 110_$i$ in the first row. Thus, the sensor pad is to be implemented not to lose the number of bar-shaped strips b even by the decrease in the width. The decrease in the width of sensor pad 110 is achieved as the width of the outermost bar-shaped strip b is decreased. Thus, when the width W of the bar-shaped strip b formed in the sensor pad 110 is greater than (n−1)×(L+S), the number of bar-shaped strips b formed in all sensor pads 110 will be implemented to be the same by the decrease in the width of the sensor pad 110.

Figure 5:
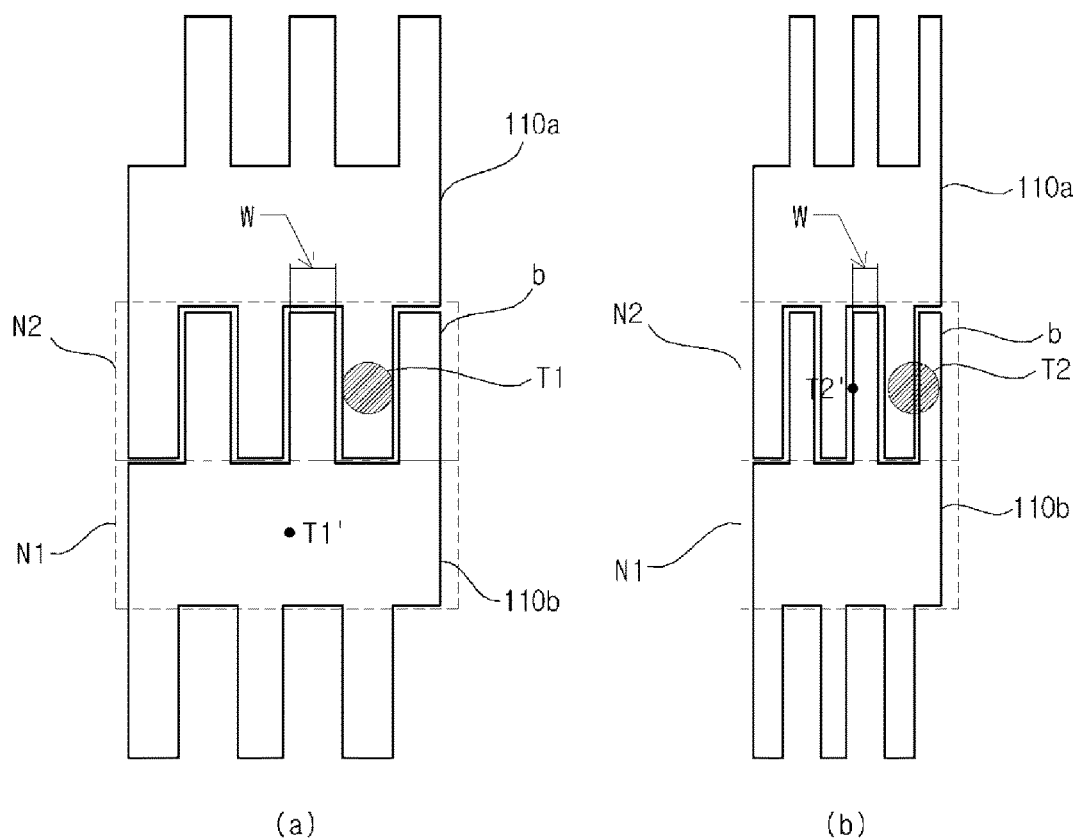

More preferably, the width W of the bar-shaped strip b may be implemented with the width of all signal wirings 120 arranged between the columns of the sensor pad 110, that is, at a level of 120% of n(L+S)+S. Considering a minimum width of the bar-shaped strip b, the number of bar-shaped strips b formed in each of the sensor pads 110 may be determined. FIG. 5 is a view illustrating sensor pads that are adjacent in the column direction according to an embodiment of the present invention.

When a first sensor pad 110$a$ and a second sensor pad 110$b$ are adjacent to each other in the column direction, a case where touch is generated at a farthest right bar-shaped strip b of the top shared area node N2 of the second sensor pad 110$b$ will be explained.

First, referring to FIG. 5($a$), when a diameter or a length of transverse direction of a touch area T1 generated by a touch generating means is smaller than the width W of the bar-shaped strip b, the touch area T1 may be formed only at the top surface of the bar-shaped strip b of the second sensor pad 110$b$. According to the touch detection method explained with reference to FIG. 3, in this case, the touch generating signal is not detected for the first sensor pad 110$a$, and the touch generating signal is detected only for the second sensor pad 110$b$.

Thus, although the touch is generated in the shared area node N2 where the first sensor pad 110$a$ and the second sensor pad 110$b$ are mutually interlocked with each other, it may be determined that the touch is generated at a center of gravity T1' of the sole area node N1 of the second sensor pad 110$b$ as a result of touch detection operation.

Meanwhile, referring to FIG. 5($b$), for the same case as above, when the length of transverse direction of the touch area T2 is greater than the width W of the bar-shaped strip b, in the case where the touch area T2 is formed in the shared area node N2 in which the first sensor pad 110$a$ and the second sensor pad 110$b$ are interlocked with each other, it is unlikely that the touch area T2 is formed only at the top surface of any one of sensor pads 110$a$ and 110$b$. That is, when the touch area T2 is formed in the shared area node N2, the touch area T2 is formed on the top surface of the bar-shaped strip b of the first sensor pad 110$a$ and the second sensor pad 110$b$. According to this, as a result of touch detection operation, the center of gravity T2' of the shared area node N2 may be determined as the touch generating point. Additionally, this point may have highly accurate touch detection compared to the case illustrated in FIG. 5($a$).

To sum up, the accuracy in touch detection for the shared area node N2 will be secured when the width W of the bar-shaped strip is shorter than the diameter or length of transverse direction of the touch area T2 formed according to the touch by the touch generating means.

More preferably, the width of the bar-shaped strip b may be 0.5 times less than the diameter or length of transverse direction of the touch area T2. Here, the touch area T2 may be a minimum touch area capable of detecting touch. The touch generating signal may be detected in each sensor pad when the touch area T2 sufficiently covers two adjacent bar-shaped strips b. Thus, considering that the touch area T2 should sufficiently cover a length adding the widths of the two adjacent bar-shaped strips b, it is preferable that the width of one bar-shaped strip b is formed to be 0.5 times less than the diameter or length of transverse direction of the touch area T2.

Figure 6:
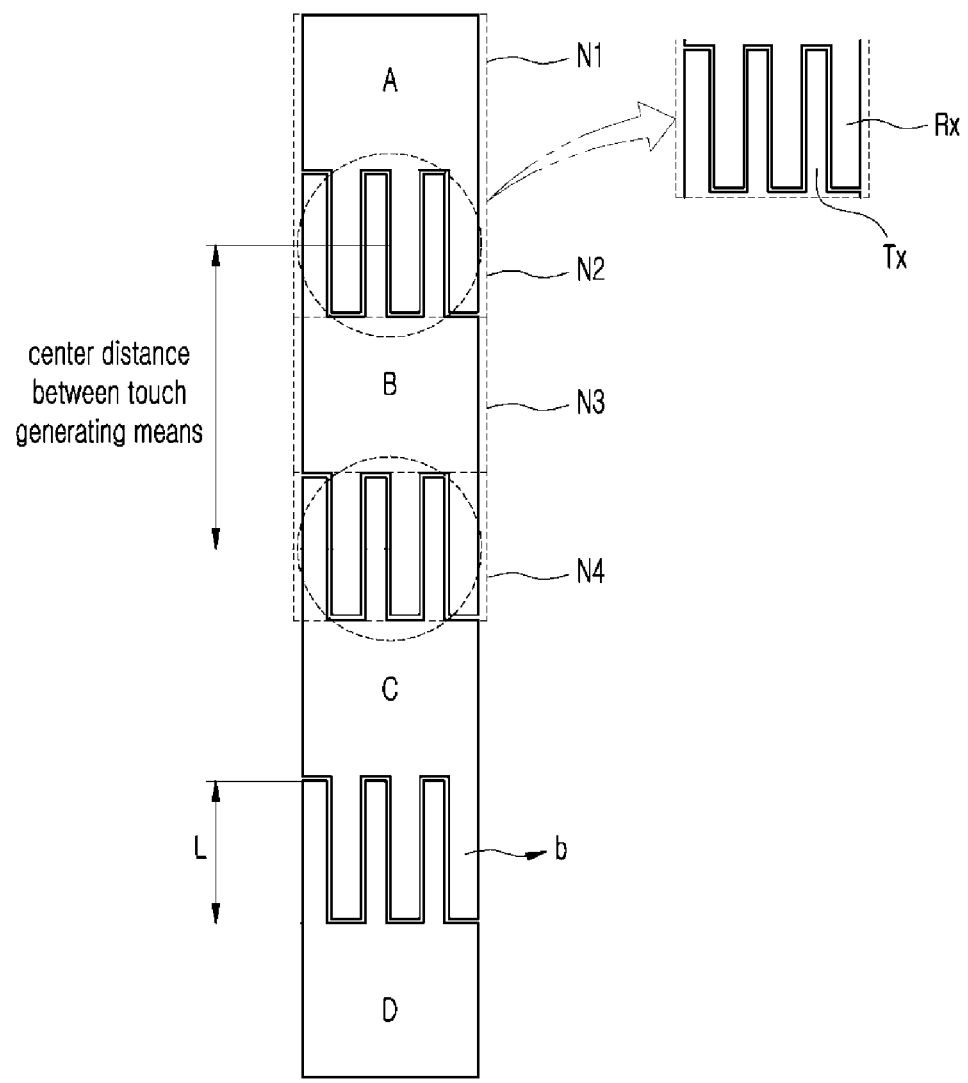
FIG. 6 and FIG. 7 are views for explaining a method for detecting touch according to an embodiment of the present invention.

FIG. 6 is a view for explaining a method for sensing touch by the touch generating means at a plurality of points at the same time, that is, multiple touches, in the touch detection device illustrated in FIG. 3.

The sensor nodes N1 and N2 including the sole area node N1 and shared area node N2 may be the unit of detection on whether a touch is generated.

It is supposed that a touch is generated in the second node N2, which is the shared area node where a part of the sensor pad B is arranged, and in the fourth node N4, which is the shared area node where parts of sensor pad B and sensor pad C are arranged together. The area where a circle is formed with broken lines in FIG. 6 is a point where the touch is made.

Meanwhile, when the touch is generated in the sole area nodes N1 and N3 where one sensor pad is solely arranged, 100% of touch generating signal is detected when the touch detection operation in a self-capacitance method for the corresponding sensor pad is performed. When the touch is generated in the shared area nodes N2 and N4 where two sensor pads are arranged together, in performing the touch detection operation in the self-capacitance method for two sensor pads where the touch contact occurs, it is supposed that 50% of touch generating signal is detected for each. Here, the touch generating signal may, for example, correspond to the difference value of output signal obtained from the corresponding sensor pad when the touch is generated and when no touch is generated.

In order to detect the touch generating point, the touch detection operation for the first node N1 is to be performed. Since the first node N1 is the sole area node where a sensor pad A is solely arranged, the touch detection operation is performed in the self-capacitance method by selecting the sensor pad A. Since the touch is generated in the second node N2, which is the shared area node, the touch generating signal corresponding to 50% may be obtained from the sensor pad A.

Meanwhile, the touch detection operation for the second node N2 is performed as below. Since the second node N2 is the shared area node where the A sensor pad A and B sensor pad B are arranged together, the touch detection operation for the second node N2 may be performed with a mutual capacitance method.

In the second node, which is the shared area node, since the bar-shaped strip of the sensor pad A and the bar-shaped strip of the sensor pad B are electrically separated from each other and are alternately arranged with each other, the mutual capacitance may be formed between the sensor pad A and the sensor pad B.

When the touch is generated on the second node N2, this is the same as the case where a conductive material is intervened between the sensor pad A and the sensor pad B, and thus the size of mutual capacitance varies. Thus, when it is possible to determine whether there is a change in the size of the mutual capacitance between the sensor pad A and the sensor pad B, the determination on whether touch is generated for the second node N2 where the sensor pad A and sensor pad B are arranged together may be made.

When applying an electrical signal to any one of the sensor pad A and sensor pad B, and obtaining an output signal from the other one, different output signals may be obtained according to whether the touch generating means is present between the sensor pad A and the sensor pad B. That is, different output signals may be obtained when no touch is generated and when the touch is generated in the second node N2.

For example, with the sensor pad A as a transmission electrode Tx in the method for detecting mutual capacitance, an electrical signal is applied to the transmission electrode Tx, and with the sensor pad B as a receiving electrode Rx, a response signal according to the application of electrical signal may be obtained. Of course, the sensor pad B may function as transmission electrode Tx, and the sensor pad A may function as the receiving electrode Rx.

In FIG. 6, the touch is generated in the second node N2. Thus, the signal which is different from that generated when no touch is generated may be obtained from the sensor pad B functioning as the receiving electrode Rx. That is, the touch generating signal corresponding to 100% may be detected in the second node N2. Thus, whether touch is generated in the second node N2 may be determined by performing the mutual capacitance touch detection method.

Since the third node N3 is the sole area node where the sensor pad B is solely arranged, the touch detection for this node may be made by performing the self-capacitance touch detection method for the sensor pad B in the same manner as the first node N1. Since the touch is generated in the second node N2 where a part of the sensor pad B is arranged together with the sensor pad A, and in the fourth node N4 where a part of the sensor pad B is arranged together with the sensor pad C, when performing the touch detection for the B sensor pad B, the touch generating signal corresponding to 100% (=50%+50%) may be obtained.

Since the fourth node N4 is the shared area node where the sensor pad B and the sensor pad C are arranged together, the touch detection for this node may be performed in the same manner as the second node N2. Specifically, by functioning any one of the sensor pad B and sensor pad C arranged together in the fourth node N4 as transmission electrode Tx and the other as the receiving electrode Rx, the touch detection operation may be performed in the mutual capacitance method. Regardless of which sensor pad is used as the receiving electrode Rx, different signals may be outputted depending on whether the touch is generated, through which it may be confirmed that touch is generated in the fourth node N4. That is, the touch generating signal corresponding to 100% may be detected in the fourth node N4.

Summarizing the above-mentioned contents for the touch detection for the first to fourth nodes N1 to N4, the touch generating signals corresponding to 50% and 100%, respectively, are obtained from the sensor node A and the sensor node B through the self-capacitance touch detection method. Additionally, it may be confirmed that the touch by the touch generating means was made in the second node N2 where the sensor pad A and the sensor pad B are arranged together, and in the fourth node N4 where the sensor pad B and the sensor pad C are arranged together, through the mutual capacitance touch detection method.

If the touch generating signal is made by one touch generating means, a center of the touch generating means will be located in the third node N3. Thus, when detecting touch for the third node N3, 200% of touch generating signal is to be obtained for the sensor pad B. However, since a total of 100% touch generating signal, 50% in the second node N2 where a part of the sensor pad B is arranged and 50% in the fourth node N4, is detected for the sensor pad B, it may be known that the touch generating signals in the second node N2 and fourth node N4 are not outputted by one touch generating means.

In other words, in a specific sensor pad, in obtaining the touch generating signal over a predetermined value (e.g., 100%) in each of the two shared area nodes N2 and N4 formed by the corresponding sensor pad, if the touch generating signal corresponding to the predetermined value of less than 200% or 100% or less is detected in the sole area node N3 where the corresponding sensor pad is solely arranged, it may be determined that the touch is generated in each of the two shared area nodes N2 and N4.

Thus, even in the same sensor pad, it is possible to sense the multiple touches over a predetermined distance and a location thereof. That is, according to a hybrid scanning method of the present invention, the touch point may be accurately determined for the multiple touches whose distance between the touch generating means is short.

Furthermore, when the touch generating signal detected in the sole area node of a specific sensor pad is over a predetermined value, and the touch generating signal detected in the shared area node formed by the corresponding sensor pad is also over the predetermined value, it may be determined that the touch is generated in both the sole area node and shared area node for the single sensor pad, that is, the multiple touches are generated for the single sensor pad.

Meanwhile, with four sensor pads A, B, C and D and four signal wirings (not illustrated) connected thereto alone, the touch generating signals for a total of 7 nodes, that is, 4 sole area nodes and 3 shared area nodes, may be obtained. Thus, the touch detection operation may be performed with the resolution which is about twice the actual number of channels. In the above explanation, the selection for each sensor pad A, B and C, signal supply for touch detection and obtainment of output signal are made by the touch detection unit 210 (see FIG. 3). Additionally, the confirmation on whether the touch is generated according to the obtainment of the output signal and determination on the touch generating point may be performed by the touch information processing unit 220. Specifically, the touch detection unit 210 detects the touch generating signal in the sole area node and the touch generating signal in the shared area node, and the touch information processing unit 220 processes touch information generated in the sole area node and shared area node to determine at which location the touch is generated.

Figure 7:
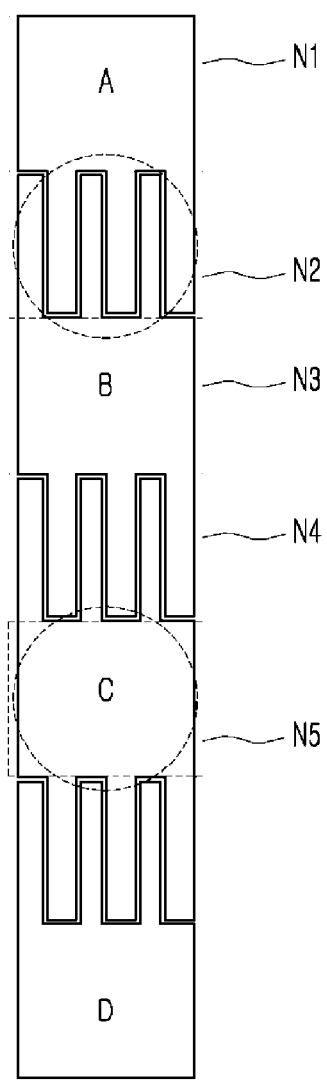

FIG. 7 is a view for explaining another example of performing the touch detection according to an embodiment of the present invention. The area where a circle is formed with broken lines in FIG. 7 is an area where the actual touch is made.

In the same manner as the explanation with reference to FIG. 6, FIG. 7 also performs the touch detection operation in the self-capacitance method as to the first node N1, third node N3 and fifth node N5, and performs the touch detection operation in the mutual capacitance method for the second node N2 and fourth node N4.

Since the touch is generated in the second node N2 where the sensor pad A and the sensor pad B are arranged together, and in the fifth node N5 where the sensor pad C is solely arranged, the touch generating signal corresponding to 50% will be obtained in each of the sensor pad A and the sensor pad B as a result of touch detection operation in the self-capacitance method for the first node N1. As a result of touch detection operation in the mutual capacitance method for the second node N2, the touch generating signal corresponding to 50% for B will be obtained. Likewise, the touch generating signal corresponding to 50% will be obtained as a result of touch detection operation for the third node N3, and the touch generating signal corresponding to 0% will be obtained as a result of touch detection operation for the fourth node N4. Finally, the touch generating signal corresponding to 100% will be obtained as a result of touch detection operation with the self-capacitance method for the fifth node N5.

Since the touch generating signal is not detected in the fourth node N4, which is the shared area node, a boundary between the touch generating points may be clarified through the fourth node N4. Due to this, it is clear that the touch is generated in the second node N2 where the sensor pad A and the sensor pad B are arranged together, and in the fifth node N5 where the sensor pad C is solely arranged.

As explained above, the touch detection operation for the shared area nodes N2 and N4 are performed in the mutual capacitance method. In terms of mutual capacitance method, the size of mutual capacitance formed between the sensor pads is important.

In the case of the second node N2, for example, the size of mutual capacitance formed between the sensor pad A and sensor pad B affects accuracy of touch detection operation for the second node N2. When there are two conductors facing each other, a capacitance value formed by the two conductors is proportional to the area which the two conductors face, and is inversely proportional to the distance between the two conductors. Since the sensor pads adjacent to each other in the column direction forms maximum mutual capacitance, the size of mutual capacitance formed is proportional to the length L of the bar-shaped strip b.

When the size of mutual capacitance becomes excessively large, the point detected that the touch is generated is biased around the shared area nodes N2 and N4. In contrast, when the size of mutual capacitance becomes excessively small, the point detected that the touch is generated is biased around the sole area nodes N1 and N3.

Thus, it is preferable to properly adjust the length L of the bar-shaped strip b so that the mutual capacitance between the adjacent sensor pads is formed within an optimal range.

Figure 8:
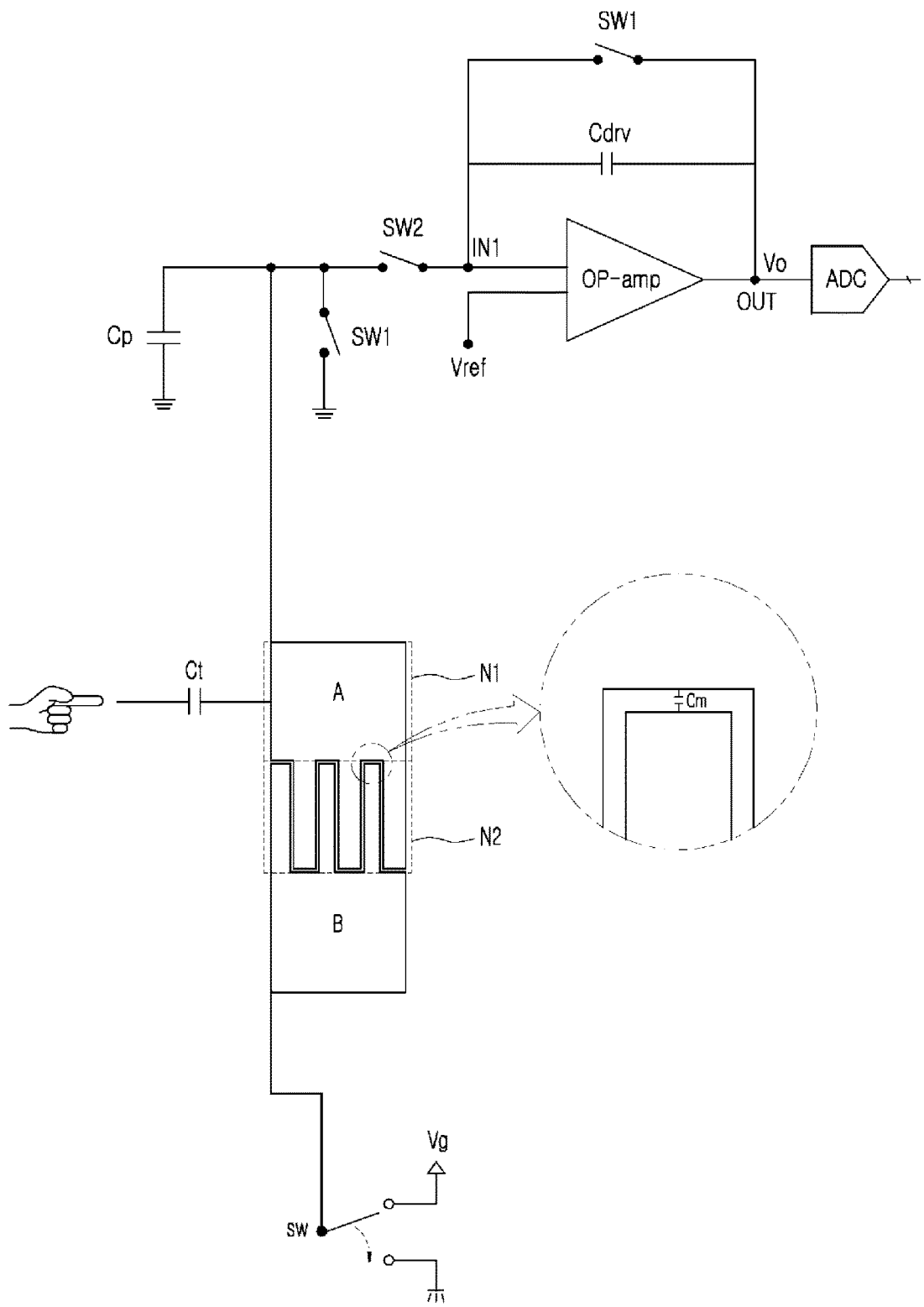
FIG. 8 is a circuit diagram illustrating the configuration of a touch detection unit according to an embodiment of the present invention.

FIG. 8 is a circuit diagram for explaining principles of self-capacitance method and mutual capacitance method in the method for detecting touch explained with reference to FIG. 6 and FIG. 7.

The method for detecting touch in the first node N1 where the sensor pad A is solely arranged and in the second node N2 where the sensor pad A and sensor pad B are arranged together will be explained with reference to FIG. 8.

Touch capacitance Ct is formed between the touch generating tool and the sensor pad A. The sensor pad A is selectively connected to a ground voltage by a first switch SW1, and is selectively connected to a first input end IN1 of an operation amplifier OP-amp through a second switch SW2. Driving capacitance Cdrv is formed between the first input end IN1 and an output end OUT of the operation amplifier OP-amp, and the first switch SW1 is connected to both ends of the driving capacitance Cdrv. Additionally, a reference voltage Vref is inputted to a second input end of the operation amplifier OP-amp. Meanwhile, unknown parasitic capacitance Cp is formed in the sensor pad A. The first and second switches SW1 and SW2, driving capacitance Cdrv, operation amplifier OP-amp, analogue-digital converter ADC, etc. may be included in the touch detection unit 210 (see FIG. 1).

The touch detection operation for the first node N1, which is the sole area node where a part of the sensor pad A is solely arranged, is performed in the self-capacitance method. An explanation thereof is as below.

When the first switch SW is in an ON state after the sensor pad A is selected by a multiplexer (not illustrated) included in the touch detection unit 210, the sensor pad A is connected to the ground voltage to be reset, and both ends of driving capacitance Cdrv become potentiodynamic and then is reset. Thus, the parasitic capacitance Cp, touch capacitance Ct, and driving capacitance Cdrv are all reset.

When the first switch SW1 is in an OFF state and the second switch SW2 is in an ON state, the potential of the first input end IN1 of the operation amplifier OP-amp becomes the same as the reference voltage Vref. When reaching a normal state, both the touch capacitance Ct and parasitic capacitance Cp are charged to reference voltage Vref. In this case, the sum of quantity of electrical charge charged in the touch capacitance Ct and parasitic capacitance Cp becomes identical to the quantity of electrical charge charged in the driving capacitance Cdrv by a conservation law of electrical charge.

Before the second switch SW2 is turned on, a potential difference between both ends of the driving capacitance Cdrv is 0 V. Additionally, since the potential of a node connected to the first input end IN1 of the operation amplifier OP-amp of one end of the driving capacitance Cdrv is maintained as the reference voltage Vref, the change in voltage ΔVo of the output end OUT of the operation amplifier OP-amp before and after touch becomes the same as the voltage Vdrv at both ends of the driving capacitance Cdrv after the second switch SW2 is turned on.

As mentioned above, the quantity of electrical charge charged in the driving capacitance Cdrv is identical to the sum of quantity of electrical charge charged in the touch capacitance Ct and parasitic capacitance Cp. Thus, the voltage Vdrv at both ends of the driving capacitance Cdrv is proportional to the touch capacitance Ct.

Thus, through the change in voltage Vo of output end OUT of the operation amplifier OP-amp, the touch capacitance Ct formed in the sensor pad A may be measured with the self-capacitance method.

Next, the touch detection operation for the second node N2 which is the shared area node where the sensor pad A and sensor pad B are arranged together will be explained. This is performed in the mutual capacitance method.

In this case, the sensor pad A may function as the receiving electrode Rx, and the sensor pad B may function as the transmission electrode Rx, and vice versa. Hereinafter, a case where the sensor pad A and sensor pad B function as the receiving electrode Rx and transmission electrode Tx, respectively, will be explained.

Mutual capacitance Cm varies depending on flux between the sensor pad A and sensor pad B. When the touch is generated in the second node N2 where the sensor pad A and sensor pad B are arranged together, a part of the corresponding flux is absorbed by the touch generating means, and thus a specific value of mutual capacitance Cm may be formed.

When changing the potential of the sensor pad B in an instant while the multiplexer of the touch detection unit 210 selects the sensor pad A, the mutual capacitance Cm between the sensor pad A and the sensor pad B is changed.

Since the mutual capacitance Cm is identical to the state of being connected with the touch capacitance Ct in parallel, when the first switch SW1 is turned off and the second switch SW2 is turned on, the quantity of electrical charge charged in the driving capacitance Cdrv becomes equal to the sum of quantity of electrical charge charged in the touch capacitance Ct, parasitic capacitance Cp and mutual capacitance Cm.

Thus, when the mutual capacitance Cm is changed, the quantity of electrical charge charged in the driving capacitance Cdrv will also be changed. Consequently, the voltage Vo at the output end OUT of the operation amplifier OP-amp will be changed.

Since the mutual capacitance Cm has different values in the second node N2 when the touch is generated and no touch is generated, by detecting the output voltage Vo at the sensor pad A, that is, an increased value or a decreased value of a voltage Vo level of the output end OUT in the operation amplifier OP-amp, whether touch is generated for the second node N2 and the touch generating state may be determined.

Meanwhile, an instant potential fluctuation operation for the sensor pad B may be performed in various methods. For example, when the detection operation on whether the touch for the sensor pad B is generated is not performed, the sensor pad B may be connected to the reference voltage Vo by the switch SW. By connecting the sensor pad B instantly to another potential (e.g., ground voltage) through the switch SW control, the instant potential fluctuation operation may be performed.

It is not necessary to perform the touch detection operation for the sole area node N1 and the touch detection operation for the shared area node N2, sequentially. It is sufficient that the touch detection operation for the shared area node N2 is selectively performed. For example, the touch detection operation in the self-capacitance method for the entire sensor pad may be performed as many as N frames (N is a natural number), and then the touch detection operation in the mutual capacitance method for the shared area node N2 may be performed. Also, the touch detection operation in the self-capacitance method for the sole area node N1 may be performed, and then the touch detection operation in the mutual capacitance method for the shared area node N2 may be performed only for the case where the touch generating signal is detected in any sensor pad. Here, the "frame" may be a unit of performing touch detection operation for all of the sensor pads.

According to an embodiment of the present invention, when the sensor pads are interlocked with each other and arranged, whether the touch is generated in the area interlocked may be accurately known. Thus, accuracy in touch detection may be improved.

Additionally, since it may be accurately determined whether the touch is generated in the area where the sensor pad is solely arranged, or in the area where different sensor pads are interlocked with each other and arranged, the touch points may be accurately detected even for the multiple touches in a close distance.

Figure 9:
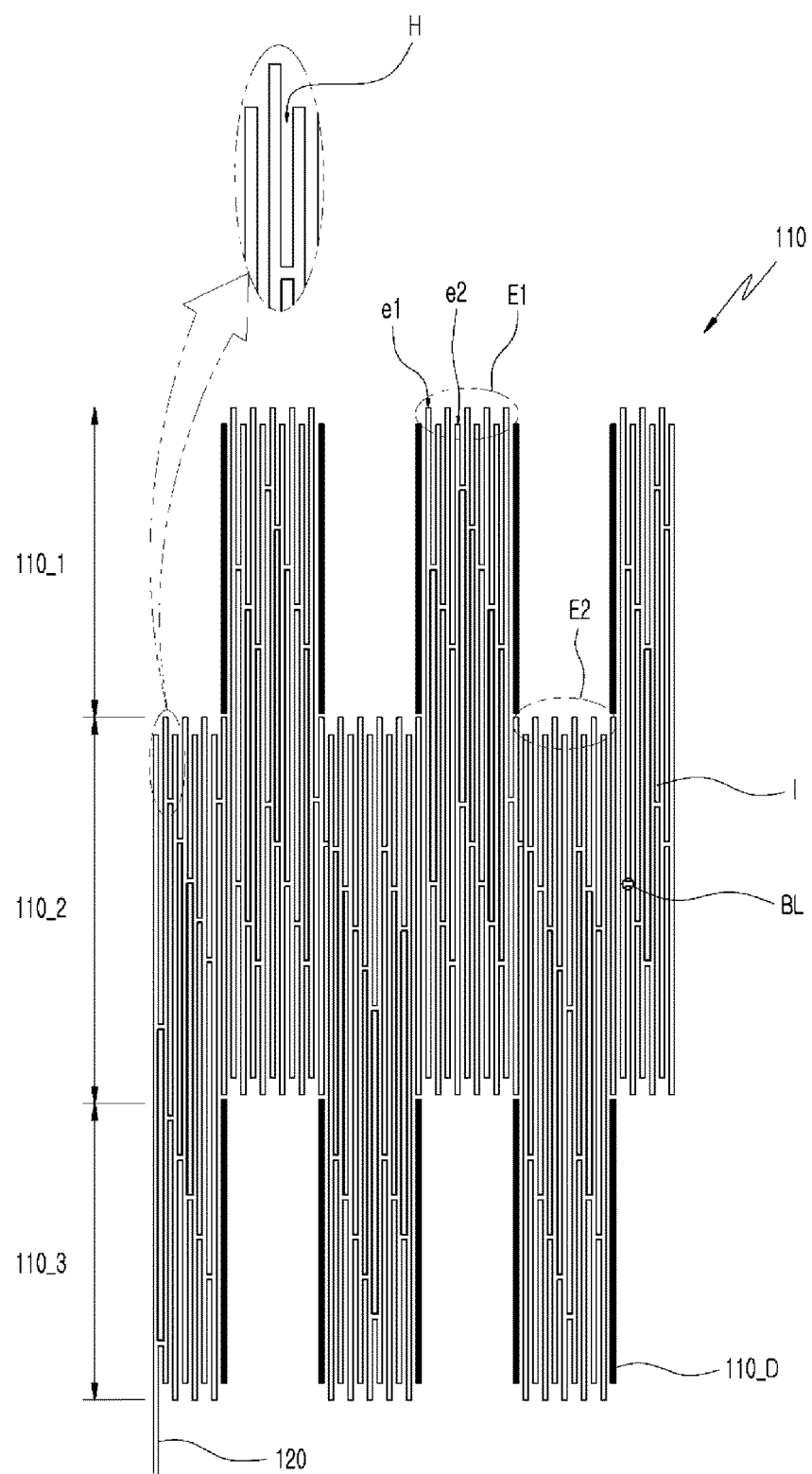
FIG. 9 is a view illustrating the configuration of a sensor pad of a touch detection device according to an embodiment of the present invention.

FIG. 9 is a view for explaining the detailed structure of the sensor pad in the touch detection device according to an embodiment of the present invention.

Referring to FIG. 9, as mentioned above, one sensor pad 110 may consist of a top sub-pad 110_1, a middle sub-pad 110_2, a bottom sub-pad 110_3.

The middle sub-pad 110_2 may be formed in a quadrangle form. A plurality of grooves H are formed in the inner direction in the area not connected to the top sub-pad 110_1 or bottom sub-pad 110_3 among the top and bottom edge areas in first direction (preferably, column direction) of the middle sub-pad 110_2. The longitudinal direction of the plurality of grooves H may be formed to be parallel to the column direction where the sensor pad 110 is arranged.

The plurality of grooves H may have different depths. According to one embodiment, as illustrate in FIG. 9, when the plurality of grooves H are formed to be parallel to the row direction of the middle sub-pad 110_2 of the sensor pad 110 at predetermined intervals, the depth of groove H may periodically repeat increasing or decreasing with respect to the row direction.

Meanwhile, the longitudinal directions of the top sub-pad 110_1 and bottom sub-pad 110_3 are formed with a plurality of bar-shaped strips parallel to the column direction where the sensor pad 110 is arranged. These bar-shaped strips are electrically connected to the top edge and bottom edge of the middle sub-pad 110_2 formed in a quadrangle form. For the sake of convenience, it was explained that the top sub-pad 110_1 and bottom sub-pad 110_3 are electrically connected to the middle sub-pad 110_2. However, it is preferable that the middle sub-pad 110_2, the top sub-pad 110_1 and the bottom sub-pad 110_3 are integrally manufactured.

The same grooves H as those formed in the middle sub-pad 110_2 are formed in the top edge of the bar-shaped strips forming the top sub-pad 110_1 (i.e., one end), and the bottom edge of the bar-shaped strips forming the bottom sub-pad 110_3 (i.e., one end). The longitudinal direction of the plurality of grooves H formed in the top sub-pad 110_1 and bottom sub-pad 110_3 may be parallel to the column direction where the sensor pad 110 is arranged. The depth of grooves H may be formed to periodically repeat increasing or decreasing according to the column direction where the sensor pad 110 is arranged.

To sum up, a plurality of grooves H whose longitudinal direction is parallel to the column direction where the sensor pad 110 is arranged may be formed in at least part of the edge of sensor pad 110.

Meanwhile, among the areas of top sub-pad 110_1, middle sub-pad 110_2 and bottom sub-pad 110_3, a plurality of slits 1 whose longitudinal direction is parallel to the column direction where the sensor pad 110 is arranged is formed in the area where no groove H is formed.

The width of slits 1 may be formed to be the same as that of the grooves H, and each of both ends of the slit may be formed to be adjacent to a distal end of another groove H. When a portion where one end of the slit 1 contacts the distal end of the groove H is defined as a bridge BL, the sensor pad 110 is separated by the slit 1 and groove H, but it may be described that the sensor pad may consist of a plurality of strip pads which are electrically connected to each other through the bridge BL.

As mentioned above, each of the sensor pads 110 is connected to the driving unit 200 (see FIG. 3) through one signal wiring 120. If the groove H and slit 1 are not formed in the sensor pad 110, a difference in pattern between the area where the signal wirings 120 are arranged side by side and the area where the sensor pad 110 is arranged may occur. Specifically, the area where the plurality of signal wirings 120 are arranged side by side has the shape where a plurality of strips are arranged side by side at predetermined intervals, but the area where the sensor pad 110 is arranged has the shape where one electric conduction plate is widely arranged. Additionally, the touch panel 100 (see FIG. 3) is generally arranged on the display device. However, due to the difference in optical transmittance between the area where the signal wiring 120 is arranged and the area where the sensor pad 110 is arranged, light emitted from the display device would have different optical transmittance in both areas.

In the embodiment of the present invention, the groove H and slit 1 are formed in the sensor pad 110, and the widths of groove H and slit 1 are formed to be the same as the gap between the signal wirings 120. Additionally, by forming the gap between the grooves H which are parallel to each other and the gap between the slits 1 to be the same as the width of signal wiring 120, the pattern in appearance between the area where the sensor pad 110 is arranged and the area where the signal wiring 120 is arranged may be formed to be the same.

Accordingly, when laminating the touch panel 100 on the display device, the difference in optical transmittance between the area where the sensor pad 110 is arranged and the area where the signal wiring 120 is arranged may be removed.

Meanwhile, according to an embodiment, distal ends of electric conductors e1 and e2 connected with each other through the bridge BL and separated by the groove H in the edges E1 and E2 in the column direction of the sensor pad 110 may be formed to be located at different heights with respect to the straight line in the row direction.

From this formation, a gap in the form of straight line may not be formed in a boundary between the sensor pads 110 arranged to be adjacent to each other in the column direction. That is, since the distal ends of the electric conductors e1 and e2 located at the edges Z1 and Z2 in the column direction have different heights, and the sensor pads 110 which are adjacent to each other in the column direction through these distal ends are interlocked with each other, a boundary surface by which the sensor pads are separated cannot be confirmed with naked eyes. Thus, according to this structure, visibility may be further improved.

Meanwhile, a part of the sensor pad 110 may be damaged by electrostatic energy, etc. generated during manufacturing process or operation. Even if the part thereof is damaged, this becomes identical to the feature that the plurality of strips connected through the bridge BL are formed. Thus, in terms of entire single sensor pad 110, the sensor pad may be normally operated.

According to an embodiment of the present invention, a dummy pad 110_D may be further formed at the side edge of bar-shaped strips forming the top sub-pad 110_1 and bottom sub-pad 110_3.

The dummy pad 110_D is separated from the bar-shaped strip of the sensor pad 110 at predetermined intervals and formed, and it is preferable that the distance separated is formed to be the same as the width of groove H and slit 1. The longitudinal direction of the dummy pad 110_D is arranged parallel to the column direction of the sensor pad 110.

As mentioned above, in the areas of top sub-pad 110_1 and bottom sub-pad 110_3, the bar-shaped strips overlap with the bar-shaped strips of another sensor pad. When overlapping with the bar-shaped strips of another sensor pad as above, the dummy pad 110_D is formed to prevent the formation of parasitic capacitance between the sensor pads and signal interference. Due to this, the dummy pad 110_D may be arranged at the edge adjacent to the bar-shaped strips of another sensor pad, in the side edges of the bar-shaped strips forming the top sub-pad 110_1 and bottom sub-pad 110_3. That is, when the bar-shaped strip of the first sensor pad 110 and the bar-shaped strip of the second sensor pad 110 are arranged to be adjacent to each other, the dummy pad 110_D may be arranged therebetween.

Figure 10:
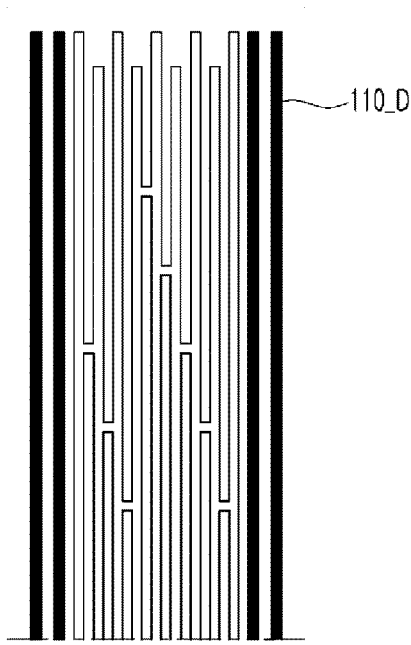
FIG. 10 is a view illustrating the configuration of a sensor pad of a touch detection device according to another embodiment of the present invention.
Figure 10:
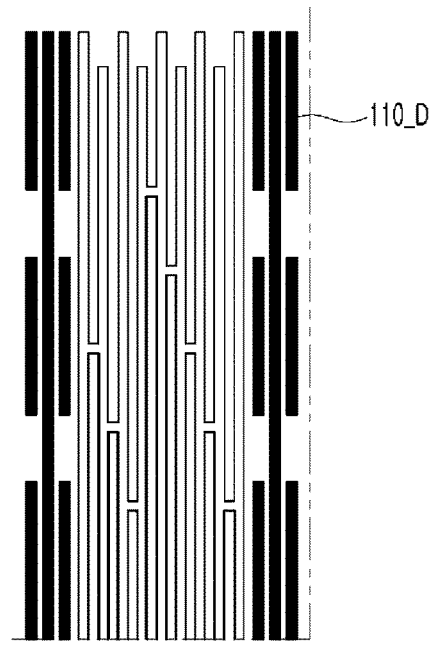
Figure 10:
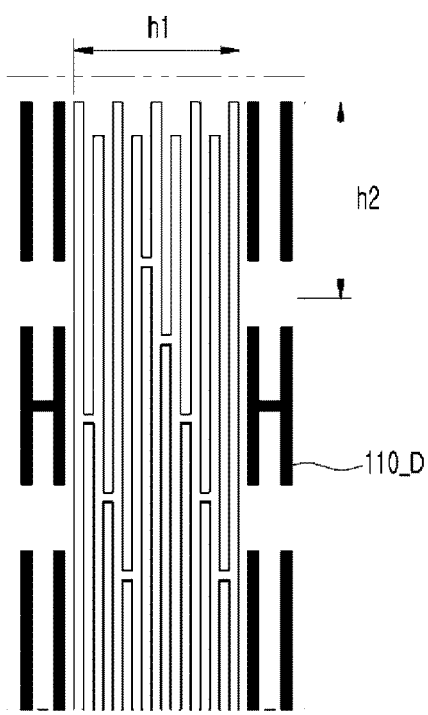
Figure 10:
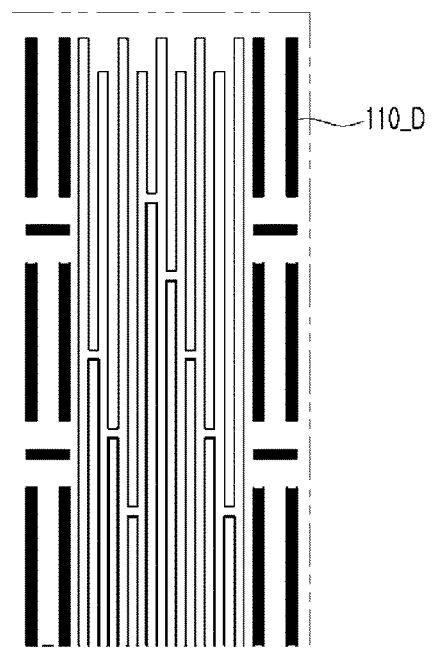

FIG. 10 is a view illustrating the shape of dummy pad 110_D according to another embodiment of the present invention.

As mentioned above, the dummy pad 110_D is formed to reduce parasitic capacitance formed by a relation between different sensor pads. However, as explained with reference to FIG. 6 to FIG. 8, when performing touch detection operation in the mutual capacitance method for the shared area node, the size of mutual capacitance formed by the relation between the sensor pads adjacent to each other in the column direction is important. Thus, the capacitance formed between the sensor pads adjacent to each other in the column direction is not to be blocked completely. When performing the touch detection operation in the self-capacitance method for the sole area node, the parasitic capacitance is effectively blocked, and when performing the touch detection operation in the mutual capacitance method for the shared area node, the mutual capacitance between both sensor pads is not to be completely blocked. That is, the size of capacitance formed by the relation between the sensor pads adjacent to each other in the column direction needs to be adjusted within a proper range.

First, referring to FIG. 10(a), at least 2 dummy pads 110_D whose longitudinal direction is parallel to the column direction of the sensor pad may be formed in at least one side of the bar-shaped strip. Since the dummy pads 110_D block the mutual capacitance between the sensor pads which are adjacent to each other in the column direction and are interlocked with each other, according to the embodiment illustrated in FIG. 10(a), the mutual capacitance may be effectively blocked by the dummy pad 11_D formed dually. FIG. 10(a) exemplifies that the dummy pad 110_D is dually formed in one side of the bar-shaped strip, but it is of course that triple or more dummy pads 110_D may be arranged.

Meanwhile, referring to FIG. 10(b), at least 2 dummy pads 110_D whose longitudinal direction is parallel to the column direction of the sensor pad are formed in at least one side out of two sides of the bar-shaped strip, but a part of dummy pads 110_D may be separated by a predetermined distance on the straight line parallel to the column direction and formed.

Through a space separated between the dummy pads 110_D which are separated from each other by a predetermined distance in the column direction and formed, the mutual capacitance may be formed according to the relation between the sensor pads adjacent to each other in the column direction. Since the dummy pad 110_D is separated by a space, the size of mutual capacitance may vary depending on the location or size of touch area. That is, by properly arranging the dummy pad 110_D, a blocking amount of the mutual capacitance may be effectively adjusted.

Referring to FIG. 10(c) as another embodiment, the plurality of dummy pads 110_D whose longitudinal direction is parallel to the column direction, and the dummy pads 110_D which are formed to be parallel to each other are electrically connected with each other, and the dummy pad 110_D whose longitudinal direction is parallel to the row direction may be further formed.

The mutual capacitance formed in the area where the dummy pad 110_D whose longitudinal direction is parallel to the row direction is formed and the area otherwise differ from each other in size. By properly selecting whether the dummy pads 110_D parallel to the row direction are arranged or the number thereof, etc., the size of mutual capacitance formed between the sensor pads adjacent to each other in the column direction may be adjusted. Specifically, in FIG. 10(c), the dummy pads 110_D which are not connected to the dummy pad 110_D parallel to the row direction, that is, the dummy pads 110_D arranged at the top and bottom in the drawings, block the mutual capacitance between adjacent sensor pads as illustrated in FIG. 10(a). Meanwhile, since the dummy pads 110_D connected to the dummy pads 110_D parallel to the row direction are connected with each other, they block the mutual capacitance formed between the adjacent sensor pads relatively less than the dummy pads 110_D arranged at the top and bottom. That is, by properly selecting the length of dummy pads 110_D whose longitudinal direction is parallel to the row direction or the number thereof, etc., the size of mutual capacitance between the adjacent sensor pads may be effectively adjusted.

The number of dummy pads 110_D formed to be parallel to the row direction may vary as illustrated in FIG. 10(c). Additionally, the length h2 of the dummy pad 110_D whose longitudinal direction is parallel to the column direction may be formed to be substantially the same as the width h1 of the bar-shaped strip.

As another embodiment, referring to FIG. 10(d), the dummy pads 110_D whose longitudinal direction is parallel to the row direction may be formed in the gap between the plurality of dummy pads 110_D separated with a certain gap in the column direction and formed. In the same manner as FIG. 10(c), in FIG. 10(d), the size of the mutual capacitance between the adjacent sensor pads formed in the area where the dummy pads 110_D parallel to each other in the row direction are arranged and the area where the dummy pads 110_D parallel to each other in the column direction varies. Thus, the size of entire mutual capacitance may be adjusted. A difference from the embodiment illustrated in FIG. 10(c) is that the dummy pads 110_D parallel to the row direction are not connected to the dummy pads 110_D parallel to the column direction.

In the explanation in connection with FIG. 10, the width of dummy pad 110_D and the gap between the dummy pads 110_D may be formed to be the same as the gap of groove H (see FIG. 9) of the sensor pad and the gap of a part of areas of sensor pad separated by the groove H. That is, the sensor pads, dummy pads 110_D and signal wirings are arranged with the same width and gap. Accordingly, since the areas where the sensor pads, dummy pads 110_D and signal wirings are arranged have the same pattern, some areas are clearly shown, thereby improving visibility as a whole.

Figure 11:
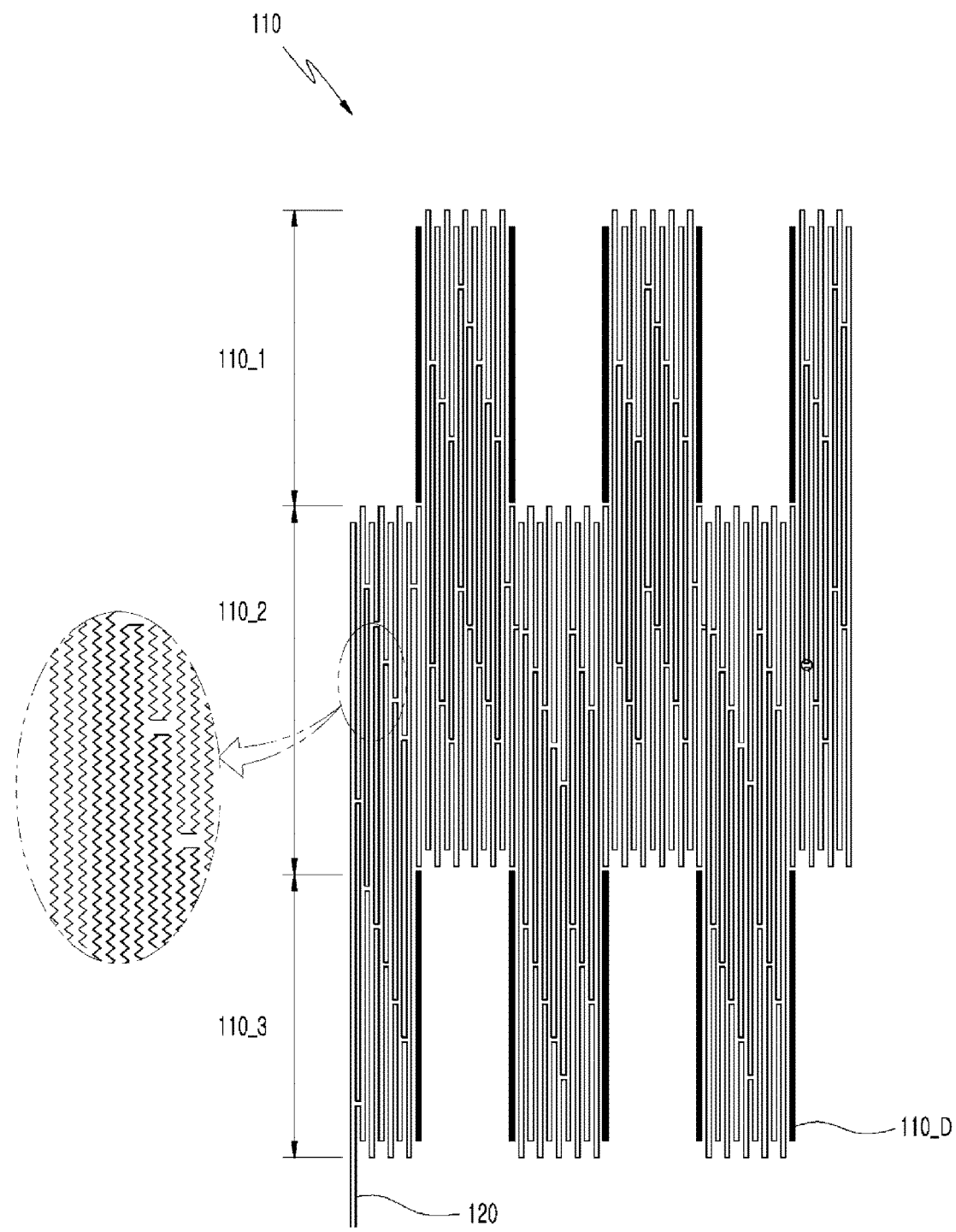
FIG. 11 is a view illustrating the configuration of a sensor pad of a touch detection device according to yet another embodiment of the present invention.

FIG. 11 is a view illustrating the shape of a sensor pad according to another embodiment of the present invention.

Referring to FIG. 11, in terms of sensor pad 110 of the present invention, the segments parallel to the column direction may be formed in a saw pattern. That is, the side edge of bar-shaped strip forming the top sub-pad 110_1 and bottom sub-pad 110_3 of the sensor pad 110, and the side edge of the middle sensor pad 110 may be formed in a saw pattern. In terms of entire sensor pad 110, between the segment forming the inner wall surface of the groove H and the segment forming the slit 1, the segment parallel to the longitudinal direction may be formed in a saw pattern. In other words, it may be explained that the sensor pad 110 consists of a plurality of strip pads separated from each other by the groove H and slit 1. In the plurality of strip pads, all the segments in the longitudinal direction may be formed in a saw pattern.

Meanwhile, accordingly, the segment of the dummy pad 110_D in the longitudinal direction may be formed in a saw pattern, and the signal wiring 120 may also be formed in a saw pattern.

The touch panel may be laminated on the display device or may be built-in. Additionally, the display device may include a backlight, a polarizing plate, a substrate, a liquid crystal layer, a pixel layer, etc. The pixel layer means a color filter formed on a surface (a top surface or a bottom surface) of the liquid crystal layer for displaying an image. Colors may be implemented in a liquid crystal display with a pixel unit of red, green and blue (hereinafter, referred to as R, G and B).

The pixel layer includes a plurality of pixels including sub-pixels of R, G and B. When the segments of the sensor pad 110 and signal wiring 120 arranged in the top touch panel are formed in the form of straight line, areas where each of the sensor pads 110 and signal wirings 120 overlaps with the sub-pixels of R, G and B may differ according to each area. Due to this, each pixel differs from each other in color temperature and the sense of color according to the optical transmittance of the sensor pads 110 and signal wirings 120 overlapping with each other in each pixel. According to the embodiment illustrated in FIG. 5, the row or column direction of the sub-pixels of R, G and B forms a predetermined angle with the segment of the sensor pad 110 and signal wiring 120. As the angle is periodically repeated and changed, when the touch panel 100 is divided into a plurality of unit areas, there would be no big difference in area where the sub-pixels of R, G and B overlap with the sensor pad 110 or signal wiring 120 per unit area. Thus, throughout the touch panel 100, the difference in color temperature and sense of color according to the area may be minimized.

Although the exemplary embodiments of the present invention have been disclosed for illustrative purposes, those skilled in the art will appreciate that various modifications, additions and substitutions are possible, without departing from the scope and spirit of the present invention. Therefore, it should be understood that the forgoing description is by way of example only, and is not intended to limit the present invention. For example, each constituent explained in singular form may be carried in multiple different elements, and likewise, constituents explained in multiple different elements may be carried out in a combined form.

The scope of the present invention is defined by the following claims, and it is intended that the present invention covers the modifications or variations of the present invention provided they come within the scope of the appended claims and their equivalents.

What is claimed is:

1. A touch detection device, comprising:
    a plurality of sensor pads formed of conductive materials and arranged in a plurality of rows and columns,
    wherein at least one side of each of the sensor pads consists of a plurality of bar-shaped strips extended in a column direction, and each of the sensor pads is arranged to be interlocked with the adjacent sensor pads by the plurality of bar-shaped strips of the sensor pads along the column direction;
    a touch detection unit which detects a first touch generating signal according to the change in touch capacitance formed between each of the sensor pads and touch generating means, and a second touch generating signal according to the change in mutual capacitance between the sensor pads which are adjacent to each other in the column direction and are arranged to be interlocked with each other by the plurality of bar-shaped strips; and
    a touch information processing unit which processes touch information generated from a sole area node consisting of a part of a single sensor pad or touch information generated in a shared area node where the sensor pads are interlocked with each other, based on the first and second touch generating signals;
    wherein the touch detection unit detects the second touch generating signal based on a changed value of an output voltage level of another sensor pad resulting from an instant change of potential of a specific sensor pad among the sensor pads forming the shared area node.

2. The touch detection device of claim 1, wherein a part of the sensors pads forms the shared area node with adjacent sensor pads such that the bar-shaped strips are interlocked with each other.

3. The touch detection device of claim 1, wherein each of the sensor pads comprises:
    a middle sub-pad; and
    a top sub-pad and a bottom sub-pad that are arranged at the top and bottom of the middle sub-pad with respect to the column direction, the top sub-pad and bottom sub-pad consisting of the plurality of bar-shaped strips extended upwardly or downwardly in the column direction.

4. The touch detection device of claim 1, further comprising:
    at least one of a plurality of dummy pads arranged between the plurality of bar-shaped strips interlocked with each other, having a longitudinal direction parallel to a first direction.

5. The touch detection device of claim 4, wherein at least a part of the dummy pads is formed with the plurality of dummy pads separated from each other in the longitudinal direction.

6. The touch detection device of claim 4, further comprising:
    at least one of the plurality of dummy pads which connects the plurality of dummy pads parallel to the first direction and arranged to be parallel to a second direction which is vertical to the first direction.

7. The touch detection device of claim 4, further comprising:
    at least one of the plurality of dummy pads formed in a space where the plurality of dummy pads are separated from each other in the longitudinal direction and arranged to be parallel to a second direction which is vertical to the first direction.

8. The touch detection device of claim 4, wherein the length of the plurality of dummy pads separated from each other in the longitudinal direction is formed to be the same as the width of the bar-shaped strip.

9. The touch detection device of claim 1, further comprising:
    a plurality of signal wirings extended to a first direction from each of the sensor pads and connected to a driving unit comprising the touch detection unit, wherein when the number of sensor pads arranged in the first direction is n, the width of each of the plurality of signal wirings is L, the gap between the plurality of signal wirings is S, and the width of the plurality of bar-shaped strips is greater than $(n-1) \times (L+S)$.

10. The touch detection device of claim 9, wherein the width of the plurality of bar-shaped strips is formed to be 120% or more compared to $n(L+S)+S$.

11. The touch detection device of claim 9, wherein the width of the plurality of bar-shaped strips is 0.5 times less than a diameter of a touch area formed by the touch generating means or a length of width direction of the bar-shaped strip.

12. The touch detection device of claim 1, wherein a plurality of grooves whose longitudinal direction is parallel to a first direction, are formed in an edge of the sensor pad, and a plurality of slits whose longitudinal direction is parallel to the first direction, are formed in at least a part of the sensor pad.

13. The touch detection device of claim 12, wherein distal ends of areas separated by the grooves are located at different heights with respect to a straight line in a second direction which is vertical to the first direction.

14. The touch detection device of claim 12, wherein the width of each of a plurality of dummy pads and the gap between adjacent dummy pads which are parallel to each other are formed to be the same as the width of the area separated by the groove and the width of the groove.

15. The touch detection device of claim 12, wherein the plurality of grooves are extended from the edge of the sensor pad or one end of the bar-shaped strip, and when the plurality of grooves are formed to be parallel to each other in a row direction at predetermined intervals, the depth of the groove periodically repeats increasing or decreasing with respect to the row direction.

16. The touch detection device of claim 12, wherein the width of the groove and slit is the same as the gap between a plurality of signal wirings extended from each of the plurality of sensor pads and parallel to each other.

17. The touch detection device of claim 12, wherein segments forming the sensor pads, the grooves and the slits are in a saw pattern.

18. The touch detection device of claim 1, wherein when the first touch generating signal and the second touch generating signal detected from the sole area node and the shared area node in the same sensor pad are over a predetermined value, the touch information processing unit processes that multiple touches are generated in the same sensor pad.

19. The touch detection device of claim 1, wherein when the second touch generating signal is detected from all shared area nodes to which a specific sensor pad belongs, and a size of the first touch generating signal according to the change in touch capacitance formed in the specific sensor pad is less than the predetermined value, the touch information processing unit processes multiple touches, which touches generated from each of the shared area nodes formed by the specific sensor pad, are generated.

* * * * *